(12) United States Patent
Mihalik et al.

(10) Patent No.: US 9,251,279 B2
(45) Date of Patent: Feb. 2, 2016

(54) METHODS AND SYSTEMS FOR USING COMMUNITY DEFINED FACETS OR FACET VALUES IN COMPUTER NETWORKS

(75) Inventors: John L. Mihalik, Pittsburgh, PA (US); Thomas A. Gerace, Boston, MA (US); Russell G. Barbour, Natick, MA (US); Richard A. Meyer, Pittsburgh, PA (US); David A. Sandborg, Pittsburgh, PA (US); James E. Bostick, Salem, MA (US); Kurt F. Wescoe, Pittsburgh, PA (US); Jennifer R. Hann, Pittsburgh, PA (US); Timothy R. Tresch, Bethel Park, PA (US); William Evans, Cambridge, MA (US)

(73) Assignee: Skyword Inc., Boston, MA (US)

( * ) Notice: Subject to any disclaimer, the term of this patent is extended or adjusted under 35 U.S.C. 154(b) by 1262 days.

(21) Appl. No.: 12/237,983

(22) Filed: Sep. 25, 2008
(Under 37 CFR 1.47)

(65) Prior Publication Data
US 2009/0198675 A1  Aug. 6, 2009

Related U.S. Application Data

(60) Provisional application No. 60/998,313, filed on Oct. 10, 2007.

(51) Int. Cl.
*G06F 17/30* (2006.01)
*G06F 7/00* (2006.01)

(52) U.S. Cl.
CPC .... *G06F 17/30873* (2013.01); *G06F 17/30864* (2013.01)

(58) Field of Classification Search
CPC ................................................ G06F 17/30023
USPC ........................................................ 707/769
See application file for complete search history.

(56) References Cited

U.S. PATENT DOCUMENTS 5,974,398 A * 10/1999 Hanson et al. ............. 705/14.64
6,778,982 B1 * 8/2004 Knight et al. ................. 707/737

(Continued)

OTHER PUBLICATIONS

Design Recommendation for Hierarchical Faceted Search Interfaces, Marti A. Hearst, School of Information UC Berkeley, 2006.*

(Continued)

*Primary Examiner* — Pavan Mamillapalli
(74) *Attorney, Agent, or Firm* — Hamilton, Brook, Smith & Reynolds, P.C.

(57) ABSTRACT

A database search method and system utilize user community defined facets and facet values for refining searches. The system provides access to a database having a plurality of records in respective categories of information. Each record has one or more facets to the respective category of information. The system enables user input of a search term formed of a first parameter indicative of at least one category of information of the database. In response to the user input, the invention system displays (a) a set of search results, including records from the database of the at least one category of information, and (b) a listing of facets and/or facet values of the records in the search results. The listing of facets and/or facet values serve as suggested additional parameters for further refining the search terms or guiding user navigation of the database. In response to user selection of a facet value from the listing, the system refines the search term resulting in a refined search term formed of the first parameter plus the user selected facet and/or facet value. A search of the database is rerun using the refined search term. The facets and facet values are defined by a computer network community of users over time and through use of the network community portal. Another embodiment is an advertising engine that displays targeted advertisements to the user based on refined search. Another embodiment is a method that utilizes refined search to help the user with navigation of a site (e.g., website or other computer network site) as a component of a GUI.

76 Claims, 15 Drawing Sheets

(56) References Cited

U.S. PATENT DOCUMENTS

| | | | |
|---|---|---|---|
| 2001/0044758 A1* | 11/2001 | Talib et al. ................... 705/27 |
| 2002/0111934 A1* | 8/2002 | Narayan ................ G06F 9/548 707/999.001 |
| 2003/0217052 A1* | 11/2003 | Rubenczyk ....... G06F 17/30643 707/999.003 |
| 2004/0243421 A1* | 12/2004 | Jannott ............ G06F 17/30873 705/26.1 |
| 2005/0171832 A1* | 8/2005 | Hull et al. ..................... 705/10 |
| 2006/0020510 A1* | 1/2006 | Vest ............................... 705/14 |
| 2006/0095281 A1* | 5/2006 | Chickering et al. ............. 705/1 |
| 2006/0253582 A1* | 11/2006 | Dixon ............... G06F 17/30864 709/225 |
| 2006/0294071 A1* | 12/2006 | Weare ..................... G06Q 30/02 707/999.003 |
| 2007/0027753 A1* | 2/2007 | Collins .......................... 705/14 |
| 2007/0050393 A1* | 3/2007 | Vogel et al. .................. 707/102 |
| 2007/0061303 A1* | 3/2007 | Ramer et al. ..................... 707/3 |
| 2007/0283241 A1* | 12/2007 | Baldonado ........ G06F 17/30699 715/230 |
| 2008/0010277 A1* | 1/2008 | Caruso ............. G06F 17/30864 707/999.005 |
| 2008/0168033 A1* | 7/2008 | Ott et al. .......................... 707/3 |

OTHER PUBLICATIONS

Egan, R., "The Secrets of Real-Time Search Success," *iMedia Connection* [online], Feb. 9, 2010, [retrieved on Feb. 10, 2010]. Retrieved from the Internet URL: http://www.imediaconnection.com/printpage/printpage.aspx?id=25877.

* cited by examiner

FIG. 2A-2

| search articles ▼ | for | enter search terms here ↑ | | help | my account | sign out |

| Search | | My Gather | Articles | Images | Video | Comments | People | Groups | Invite | Publish | Mail | article search

Articles | Images | Video | People | Groups search articles
Finding interesting content is a snap. Simply enter some keywords in the field below and click search. Refine your search using the options on the left or try advanced search to find more specific content. Learn more about search.

Results by Type
articles (0)
images >> (123)
video >> (123)

enter search terms here — 22    [search]    ⊞ Advanced Search
                                                                    — 26

Refine results
by tag: ?
No tags were
found for this
search results: 0 Articles Found for "search terms"
refined by: ?

No articles were found for this search. To broaden your search use fewer search terms or try a different search. <Learn more about search>.

by group: ?
No groups were
found for this
search

| search articles ▼ | for | enter search terms here → | help | my account | sign out |

| Search | My Gather | Articles | Images | Video | Comments | People | Groups | Invite | Publish | Mail |

25  video search         articles | images | video | people | groups

Results by Type
articles (123)
images >> (123)
video >> (123)

search video
Finding interesting content is a snap. Simply enter some keywords in the field below and click search. Refine your search using the options on the left or try advanced search to find more specific content. Learn more about search. ╱22

Refine results ~27
by tag: ?
Reviews (123)
Movies (123)
Sports (123)

| original search terms | | search | ⊞ Advanced Search | results: 500+ videos Found for "search terms"
refined by: ? ⊟movies; ⊟ drama; ⊟ essential: movies; ⊟ travolta; ⊟reviews; ⊟Best films group; ⊟tarrentino; ⊟nineties;

More tags ▼

╱26 by groups: ?
Group name (123)
Group name (123)
Group name (123)
Group name (123)

1 2 3 4 5 | next >     sort by [relevance ▼]    [▦] [▤]

23

[ >> ]  [ >> ]  [ >> ]  [ >> ]

Video Title          Video Title          Video Title          Video Title
by Member Name   by Member Name   by Member Name   by Member Name
Month DD, YYYY   Month DD, YYYY   Month DD, YYYY   Month DD, YYYY
length: 4:23 |       length: 4:23 |       length: 4:23 |       length: 4:23 |
rating: 10 |          rating: 10 |          rating: 10 |          rating: 10 |
comments: 25     comments: 25     comments: 25     comments: 25

FIG. 2A-6

| search articles ▼ | for | enter search terms here → | help | my account | sign out |

| Search | My Gather | Articles | Images | Video | Comments | People | Groups | Invite | Publish | Mail | people search 27 | articles | images | video | people | groups

Refine results
Member info: ?
male (123)
female (123)
straight (123)

[More info ▼]

location: ?
City, ST (123)
City, ST (123)

[More locations ▼]

interests: ?
Pink Floyd (123)
Hot dogs (123)

[More interests ▼]

affiliations: ?
democrat (123)

[More affiliations ▼]

search people
People blah blah blah all day long. Simply enter some keywords in the field below and click search. Refine your search using the options on the left or try advanced search to find specific people. Learn more about search. ⟵ 22

[original search terms] [search] ⊞ Advanced Search results: 500+ people Found for "search terms"
refined by: ? ⊟ straight; ⊟ married; ⊟ Boston, MA; ⊟ democrat; ⊟ buddhist; ⊟ travel; ⊟ photography; ⊟ male; ⊟ Penn state

26

1 2 3 4 5 | next >    sort by [relevance ▼]   ▦ ▤

23

Member Name
username
　　gather.com
City, ST

Member Name
username
　　gather.com
City, ST

Member Name
username
　　gather.com
City, ST

Member Name
username
　　gather.com
City, ST

METHODS AND SYSTEMS FOR USING COMMUNITY DEFINED FACETS OR FACET VALUES IN COMPUTER NETWORKS

RELATED APPLICATION

This application claims the benefit of U.S. Provisional Application No. 60/998,313, filed on Oct. 10, 2007. The entire teachings of the above application is incorporated herein by reference.

BACKGROUND OF THE INVENTION

A global computer network, such as the Internet, is formed of a plurality of computer networks, servers and end user computers interconnected across a communication line (or loosely coupled for communication to each other). Each computer network includes a multiplicity of digital processors (e.g. PC's, mini/micro computers and the like) coupled to a host processor for communication among the digital processors within that network. In turn, each host processor is coupled to the communication line which interconnects the computer networks to each other. As such, each of the computer networks is itself loosely coupled along the communication line to enable access from a digital processor of one network to a digital processor of another network in the plurality of computer networks.

The servers provide to end user computers access to the computer networks and to the various digital processors in the plurality of networks in the global computer network.

As can be imagined, a global computer network can generate an enormous pool of databases and electronic media. Publishing information on the global computer network typically requires two software components. Electronic publishers run for example Hyper Text Transfer Protocol (HTTP) server software, while users scanning or searching on the global computer network run browser software. In the example of the Internet, the World Wide Web (Web) is the protocol used to create and publish documents. Web pages display information, point to other Websites or provide a user-interactive application (generally referred to as a web portal). Some Websites and Web portals provide commerce, e.g., retail sales, secondary market transactions (eBay), or other trading, while other Websites serve governmental, philanthropic, social, or other purposes.

In order for an end user to take advantage of this wealth of information offered by a global computer network (the Internet), one needs improved tools or systems for searching and navigating the large pools of databases and electronic media of such a network.

SUMMARY OF THE INVENTION

The present invention addresses the foregoing needs of the prior art. In particular, the present invention provides a computer method and system for database search and navigation by user community-defined facets and/or facet values.

Records within a database can be described by certain common characteristics of those records. Each common characteristic is referred to as a "facet." The optional descriptors within each common characteristic are called "facet values." For example, a database containing records that refer to people may have facets that include gender, age, marital status, and favorite films. In the first example, the facet (or common characteristic) is gender. The potential facet values for the gender facet are "male" and "female." Similarly for the second example, the facet is "age" and the potential facet values could be either numbers representing years of age (e.g., 40 or 63) or age ranges (e.g., 20-34 years of age or 45-54 years of age or 60+ years of age) depending on database design.

Once facets and facet values are defined, a facet value count is created showing how many records in the data set exist for each facet value. For example, in the aforementioned database containing records of people, a database of 500 records might contain 248 records labeled male and 252 labeled female (note that many databases will have incomplete information, so facet value counts will not always total the number of records in the database). These record counts for each facet value (248 for male and 252 for female) are called "facet value counts."

In traditional databases, facets and potential facet values are defined by programmers and are selectable for each record by whomever is entering data. The present invention proposes permitting a community of users to define facet values (for facets defined by others) and/or the facets themselves (naming common characteristics) to allow community-defined classification, organization, and navigation of information. This invention further permits the manageable display and use of user- or community-defined facets and facet values using facet value count and/or relevance to a data set.

In one embodiment, the invention database search method comprises the computer-implemented steps of:
providing access to a database having a plurality of records in respective categories of information, each entry having one or more facets to the respective category of information, with any, some or all of the facets and/or facet values being defined by a community of users;
enabling user input of a search term formed of a first parameter indicative of at least one category of information of the database; and
in response to the user input, displaying:
(a) a set of search results, including records from the database of the at least one category of information, and
(b) a listing of any one or combination of facets and facet values of the records in the search results.

The listing of facets or facet values serve as suggested additional parameters for further refining the search terms or guiding user navigation of the database. The terminology "any one or combination of facets and facet values" means that facet values alone may be listed, or facets as well as facet values may be listed. In response to user selection of a facet value from the listing, the invention method and system refines the search criteria resulting in a refined search term formed from the first parameter plus the facet corresponding to the user selected facet value. Next, the invention method/system searches the database using the refined search term. This produces (i) narrowed or further limited search results relative to the first set of search results, and (ii) a corresponding listing of facets and facet values for further repeating the refinement process.

In other embodiments, multiple databases encompassing a single or multiple social networks may be searched at the same time. In such embodiments, any one or combination of the foregoing steps of "providing access," "enabling user input," "searching," "displaying," and "refining" apply to multiple databases that are interconnected and thus all accessible at the same time. The search can be initiated to search across a single or multiple social networks at the user's discretion at either or both of the initial search step and the refining step.

A. Facet Qualities (Formation, Value, Allocation)

In one aspect of the present invention, the listing of facet values is by number and kind. The facet value count is a count of the retrieved database records having a particular facet value. Further, a facet value count provides an indication of an interesting cross-section of a category of information where one considers displayed facet numbers relative to each other. Facet value counts also allow the automatic removal of facet values (and, if all facet value counts for all facet values within a facet are zero, the facets themselves) that are not used to describe a data set, In one embodiment, the listing of facets and facet values is ordered based on relevance to the data set. The listing order provides an indication of an interesting cross-section of a category of information.

In another aspect, the facets and facet values being defined by a community of users include:

users defining kinds or types of facets (characteristics),
users defining the facet values for a defined facet,
(i.e. users suggesting new categories of information and defining corresponding facets and possible facet values for these categories), and
user community-entered information defining respective values of facets.

That is, the respective values of facets are determined by any one or combination of user community activity, user selections made and user community-entered information over time. Computer system tallies (e.g. pageviews) may also determine facet values.

B. Facet Examples

In some embodiments, for categories of information pertaining to people, the facets include: gender, school, age, marital/family status, geographic location, group membership, company/business entity, entertainment/literature interest (films/TV shows watched, books read), and/or tags (subject matter/topics of interest/publications).

For categories of information pertaining to content, the facets include: media type, tags, length (number of words or minutes), rating, groups where posted, author, author ranking, number of comments, date posted (date range), by member connection, and/or by connection type/group (friend, family, colleague, etc. . . . ).

For categories of information pertaining to groups, the facets include tags, content published, membership size, geographic location, events, recency of activity, friend ownership/membership, and/or by member or number of members (e.g., groups that three or more of my friends are in or that John is in).

For categories of information pertaining to events, the facets include: location, date, number of people, friends invited, tags, group, category (fundraiser, reunion, . . . ), admission price, length of time, and/or accessibility (open/closed/private).

Other facets and facet values are suitable.

C. Results Ranking

In some embodiments, the displayed set of search results is an ordered set. For example, the displayed set of search results is a list of names, usernames, and/or images of people and ordering of the set is a ranking by relative closeness in the relationships between the user and each person listed. In another example, the ranking is by social importance within the community of users or by relative degree of listed user activity within the community.

Where the displayed set of search results is a list of content works, the ordering of the set may be a ranking by relative readership of the content works, relevance to the search, recency, ratings (including importance factor of the rater, i.e., the person who gave the rating), connection level to the author, moderated group acceptance level, tag specificity level, and/or impact among readers (i.e., discussion level of comments, number of comments and who is commenting).

In some embodiments, the displayed set of search results is limited to the content works of members posted to a certain group (or subset of members) on a site. In other embodiments, the displayed set of search results is limited to the member profiles of members connected to the searcher in a social network. The displayed set of search results may be limited to the content works of members connected to the searcher in a social network. Further, the displayed set of search results may be limited to the groups created and/or joined by members connected to the searcher in a social network.

D. Other Aspects/Features

In some embodiments, the displayed set of search results includes an indication of the facet value count for each facet value that correlates to the search result. The steps of refining the search term in response to user selection of a facet value and searching the database using the refined search term are repeated to reduce the total number of entries in the search results. This feature enables the user to ultimately produce a manageable search result set.

In a similar aspect, embodiments provide user-selectable indicia (e.g., a minus symbol) next to each parameter to enable the user to deselect one or more parameters. In response, the invention system runs the search without the corresponding one or more parameters (i.e., the ones deselected by the user).

Such features assist the user in easily specifying various permutations of search parameters to generate and view the corresponding search results. In this way the present invention enhances the user's ability to search and navigate a database or complex data store of information/electronic media.

In embodiments where a facet is defined as "Group Membership", the facet values are the groups a member has joined. Where a facet is defined as "Attendance of an Event", the facet values are the events a member is attending.

In one embodiment the facet value display is limited to facet values with a facet value count above some minimum number. Alternatively, the facet value display may be limited to a certain number of facet values for each facet. In other embodiments, the facet value display is limited by facet value count and/or number of facet values, and a user can request, receive, and select from a complete list of available facet values.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 2A-1-2C-2 are schematic illustrations of search engine screen views in one embodiment.

DETAILED DESCRIPTION OF THE INVENTION

A description of example embodiments of the invention follows.

Figure 4:
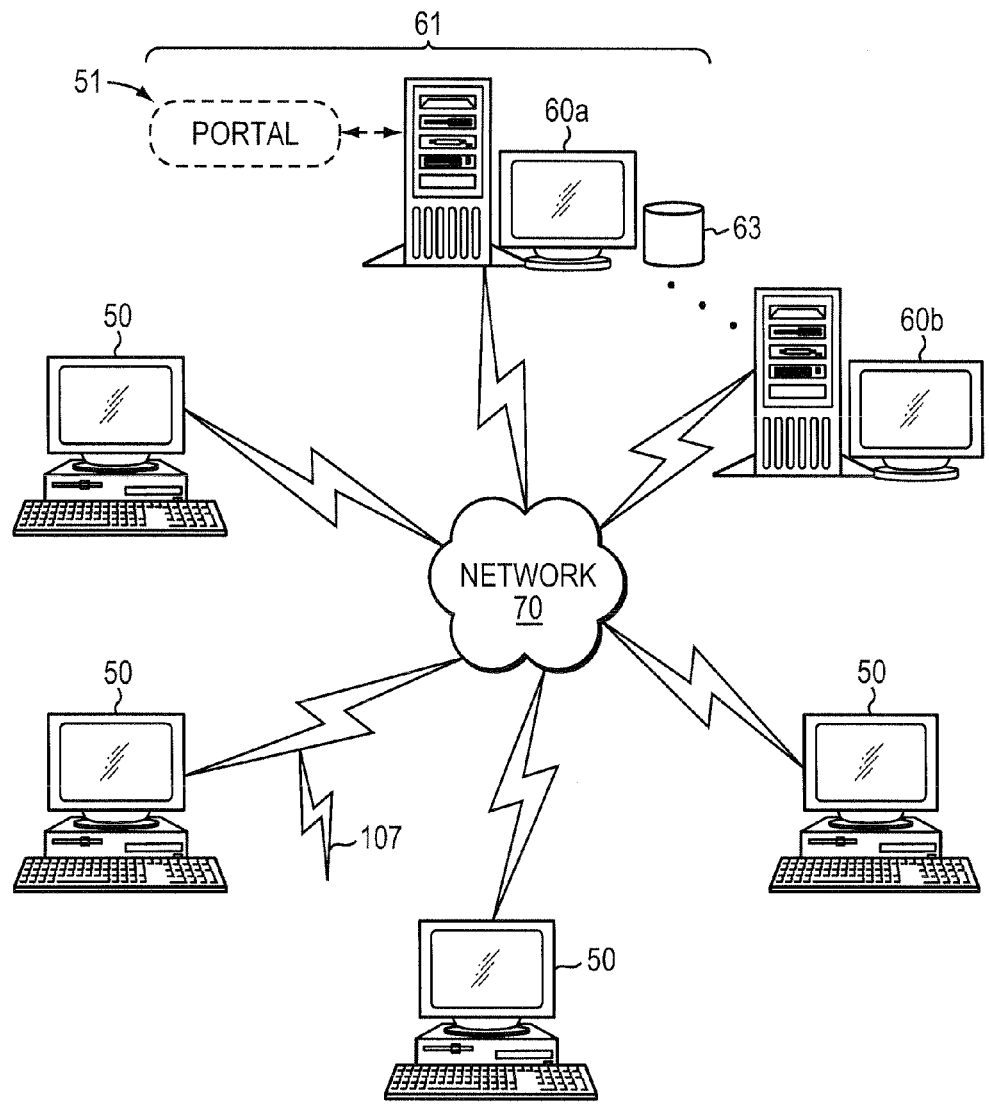
FIG. 4 is a computer network environment in which embodiments of the present invention are implemented.

In U.S. patent application Ser. Nos. 11/371,462; 11/451,995; and 11/593,864 (herein incorporated by reference), applicants disclose and describe a computer system 61 (FIG. 4), operable on a global computer network 70, that provides a user community defining portal 51 (FIG. 4). That is, the system 61 provides and maintains a portal 51 that defines a community of users. This is accomplished by the system 61 allowing community members to organize groups, communicate with one another (individuals or groups), network with one another including defining people connections and publish authored works or content. The published authored contents are viewable by other users within and outside of the portal 51 community. The published contents may be formed of or include a variety of communication and media means such as audio, video, images, comments, bookmarks, keywords (tags) and/or multimedia. Those who create authored contents are referred to as author-users, and those who view such contents are referred to as reader-users. Community members or community users are those global computer network users who interact with the subject system 61 and portal (network community site) 51.

The subject system 61 enables members to build a social network. A relation module is coupled with the subject system 61 to measure the extent and strength of the connections between users. The term "degrees of separation" is used to describe the number of users connecting a given user to a subject target person. For any given user, the subject system 61 shows the "shortest path" linking that user to a subject target person. In cases in which there are more than three degrees of separation between two users, the system 61 indicates that the users are not closely connected. In measuring the strength of the connection between two users, the relation module weighs a combination of factors such as the number of times the users have communicated through email or instant messaging and the time elapsed from when an email is received to when it is opened and replied to between the users.

The relation module allows an arbitrary group to define relations among a subset of users. The groups may be public or personal. Personal groups are designed such that the users are members of another user's personal contacts and hence have no knowledge of their membership in the group. Members of public groups, however, need to confirm their membership before they can join the group. Public group members are allowed to publish their authored works into a central location for the entire group to access. Members are allowed to comment on the authored works and are informed when a new publication occurs or someone posts a comment on an article that is part of the group. Membership of shared groups is generally viewable by all group members.

The creator of a group may disable the ability for group members to publish to the group in order to control group content. In such cases, the creator of the group may have approval authority to approve authored works submitted to the group before such authored works are published for viewing by group members. The creator of the group may also make authored works available for non-member viewing. Members of the group may invite non-members to join the group and the group creator may set preferences allowing users who are non-members to apply for group membership. Groups are searchable by their names, tags or keywords, authored works of the group, number of members, publishing rate of the group, and commenting rate.

Reader-expressed rankings are employed to determine the quality or popularity of an authored work. The change in the ranking of an authored work may be based on quality rating of the author, popularity rating of the author, and/or popularity rating multiplied by quality rating. Rating of an authored work is done across the system 61/portal 51 contents within specific tags or taxonomical categories. The author-user and/or his work is rated for popularity based on the number of times the work is forwarded or bookmarked, on the popularity rating from users, on individual user traffic, on relative traffic with respect to other authored work similarly categorized, and/or on relative traffic against other authored work over the entire network community site 51.

Authored works are given a system-wide ranking based on a combination of: rating distinguishing between serious and humorous subject matter, rating on writing quality, rating on presentation, rating distinguishing between conservative and liberal points of view, rating for suitability for different audiences and age groups, rating for compliance with one or more standards, and rating to indicate how accurately the authored work was categorized or tagged.

Reader-users further organize the authored works by suggesting alternative taxonomical categorizations and/or alternative keywords. The subject system 61 also organizes or ranks authors by the number of times an author's works are viewed by reader-users, by quality and/or popularity ratings, and by comments by others on the author. Such author ranking may be across a certain time period, by tag, or across all tags.

The subject system 61 measures the popularity of tags. This is determined by the number of times the tag is bookmarked, the number of times the tag is commented upon, or the number of times the tag is cited in an email message or other authored work. The system 61 displays a list of tags whose popularity rank has risen the most rapidly and another list for those whose rank has decreased most rapidly.

The subject system 61 can also generate a profile of individual network community users based on measuring keywords and/or word combinations commonly used by author-users or read by reader-users. Based on this profile, the system 61 may generate a list of suggested readings of authored works viewed by one or more users having a similar profile.

According to the above, users of the network site 51 or generally subject system 61 form a community. And this network community of users generates various content (authored works: text, audio, images/video, multimedia, etc.), people data (names, business affiliation, school affiliation, group membership, etc.), event data (event type, location, dates, times, invitees, etc.) and the like. That is, the user-generated data includes data created by the user and uploaded or otherwise submitted to the portal 51 as well as data entered by the user, some of which categorizes, indexes, and/or forms relations of the various pieces of data (as will be made clear below).

The present invention provides a search engine 10 (FIG. 1) that enables users to browse, navigate through, and find information of interest in this continually growing and changing wealth of network community (portal 51) data. Although the following describes the present invention as a search engine 10 for the above described computer system 61 and portal (or network community site) 51, the invention search engine 10 may be utilized in other computer systems, global computer network systems/portals and sites, or data store systems and the like.

Specifically, an embodiment of the invention search engine 10 delivers search results for content (authored works) searches (including articles, images, and video), people searches, group searches and event searches. The invention search engine 10 enables searcher-users to refine search results lists by certain facets in order to get more meaningful results.

A "facet" as used herein is defined as a dimension or attribute of the data that is being explored. For example, for searching on content published on the network community site (or portal) 51, the facets available in one embodiment are content type (article, video, or images), tags assigned by the author-user, and groups the content is published to. When searching for content within the network community site 51, these facets are available to the user (i.e., searching process user interface) to enable the user to focus the search results more accurately. Moreover, these facets are combinable over and over within the search results. For example, search results can be displayed for site-published content (authored work) that was tagged with "politics", "bush", "iraq", and also published to system groups "Politics", and "News". The facets can be combined in any order.

A "facet value" is defined as a specific value of a facet found within any search result. For example, a facet value may be "politics" for the facet "tag" or "married/no children" for the facet "marital/family status". Thus generally speaking facets may be thought of as categories and facet values are items or members of a category. Facet values may be numerical (e.g., a range), dates/time or other data type. Some facets have logically limited facet values (e.g., the facet "gender" only has facet values "male" and "female"). Other facets have an open ended set of facet values which can change and grow based on user community input.

In some embodiments, facets may have subfacets. An example is the "city/state/country" hierarchy of facets. Similarly, facet values being arbitrarily user community-defined may have such similarities as to warrant stemming. For example, a facet "tag" may have community user-developed facet values "needle work", "embroidery", "knitting", and "crocheting". Some embodiments may stem (string) together these facet values to effectively form one facet value.

Some facets may be simple-user-defined. For example, a group owner may define a facet (aspect or characteristic) for members of his group.

Whenever search results are displayed, the invention system 10 displays to the searcher-user the quantity of search results that match within each facet value. For example, the tag "politics" may have 5623 matching records of 7503 total records in the search results. When a search is made, the invention system 10 dynamically displays the facets and facet values that are available for further drilldown in descending order or quantity. This prompts the searcher-user to explore the search results and allows intuitive refinement of search results.

In some embodiments, the listing of any one or combination of facets and facet values for further drilldown is in order of relevance to the data set, where "relevance" may be defined by rank ordering of count of occurrences or statistical correlation (the strength and direction of a linear relationship between two random variables) with respect to the search query.

Figures 1, 2A:
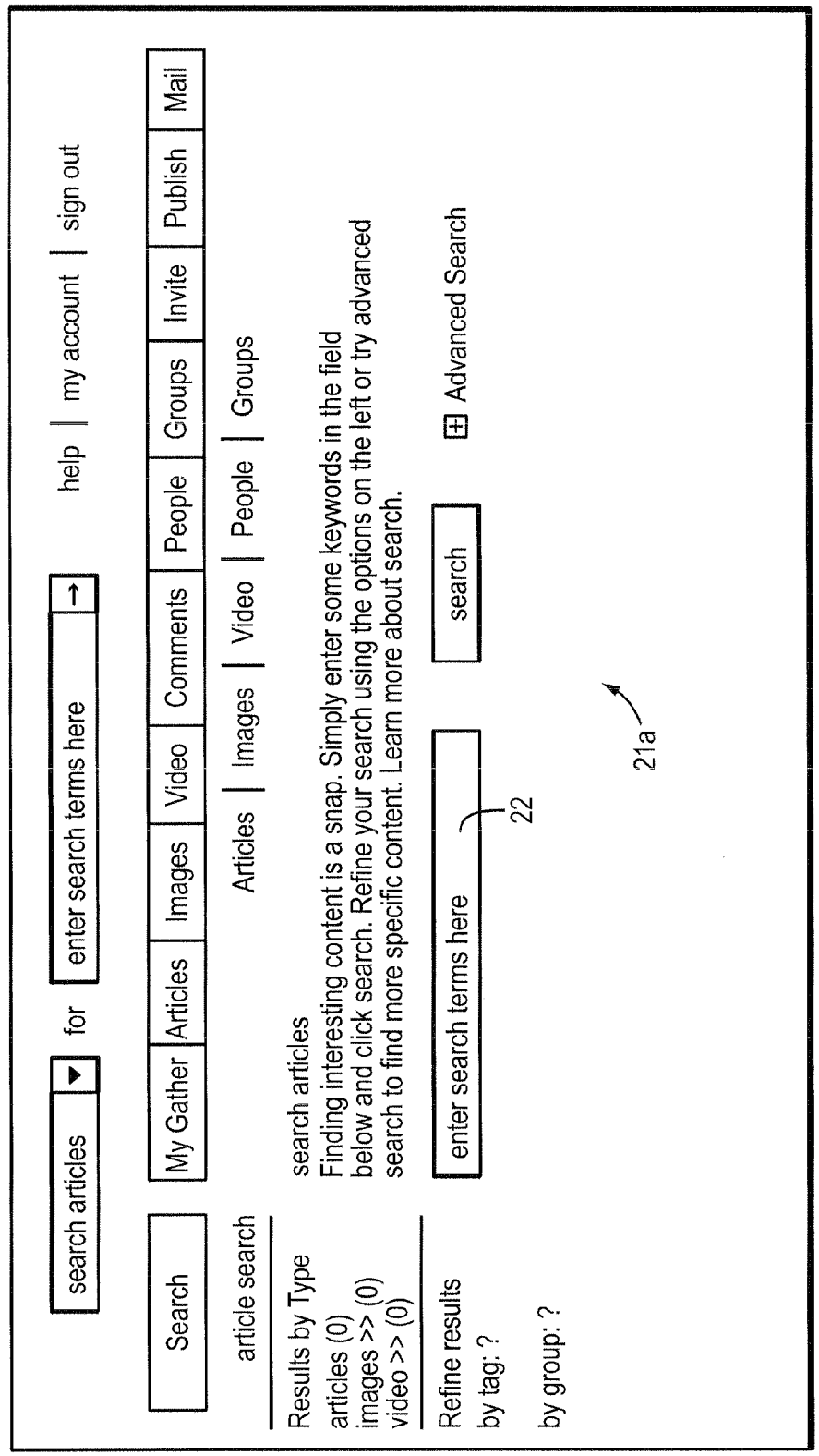
Figures 2, 2A, 3:
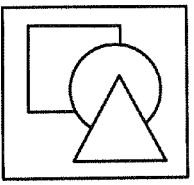
Figures 2, 2B:
Figures 2, 2B, 3:
Figures 1, 2C:
Figure 2C-2:
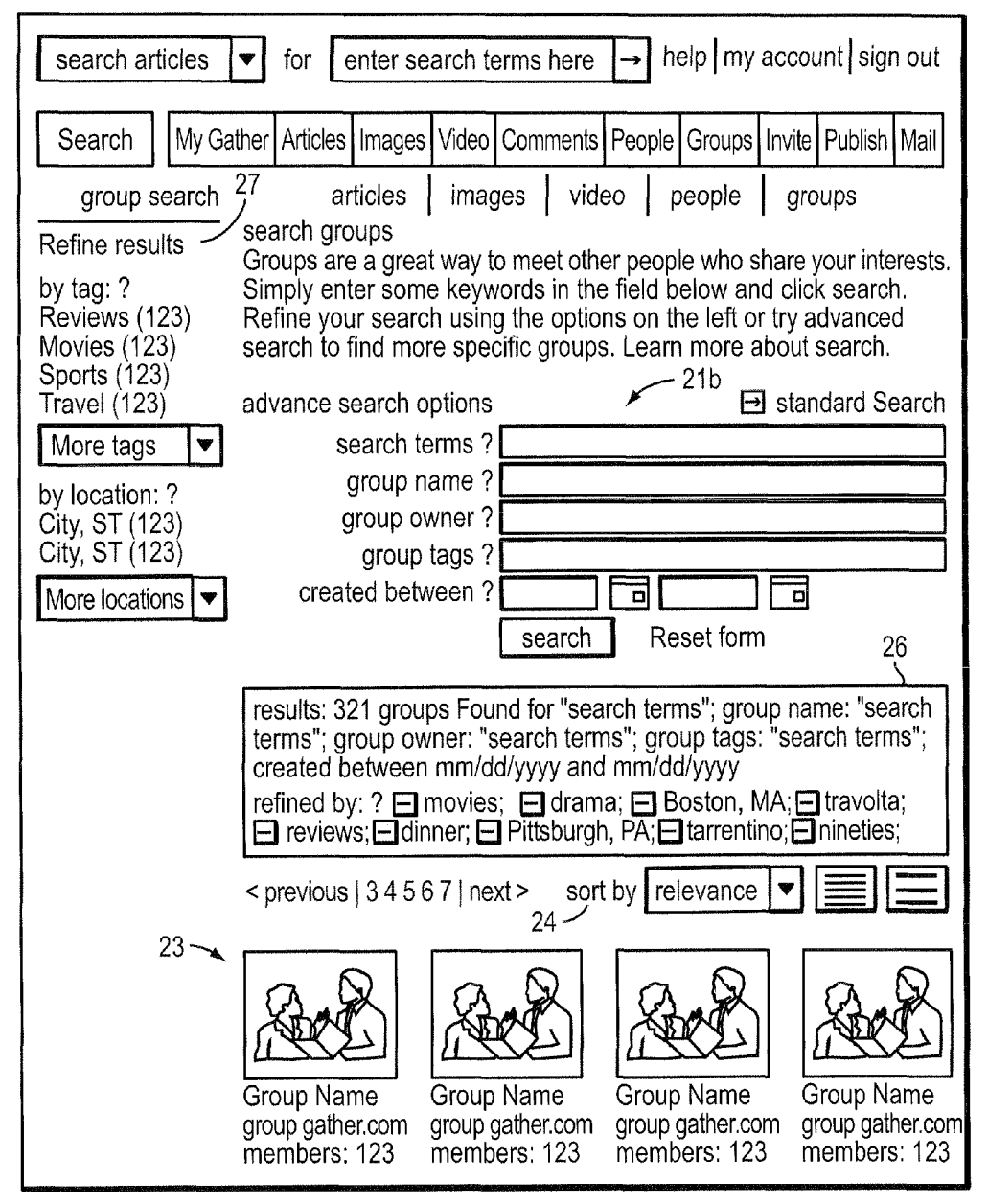
Figure 3:
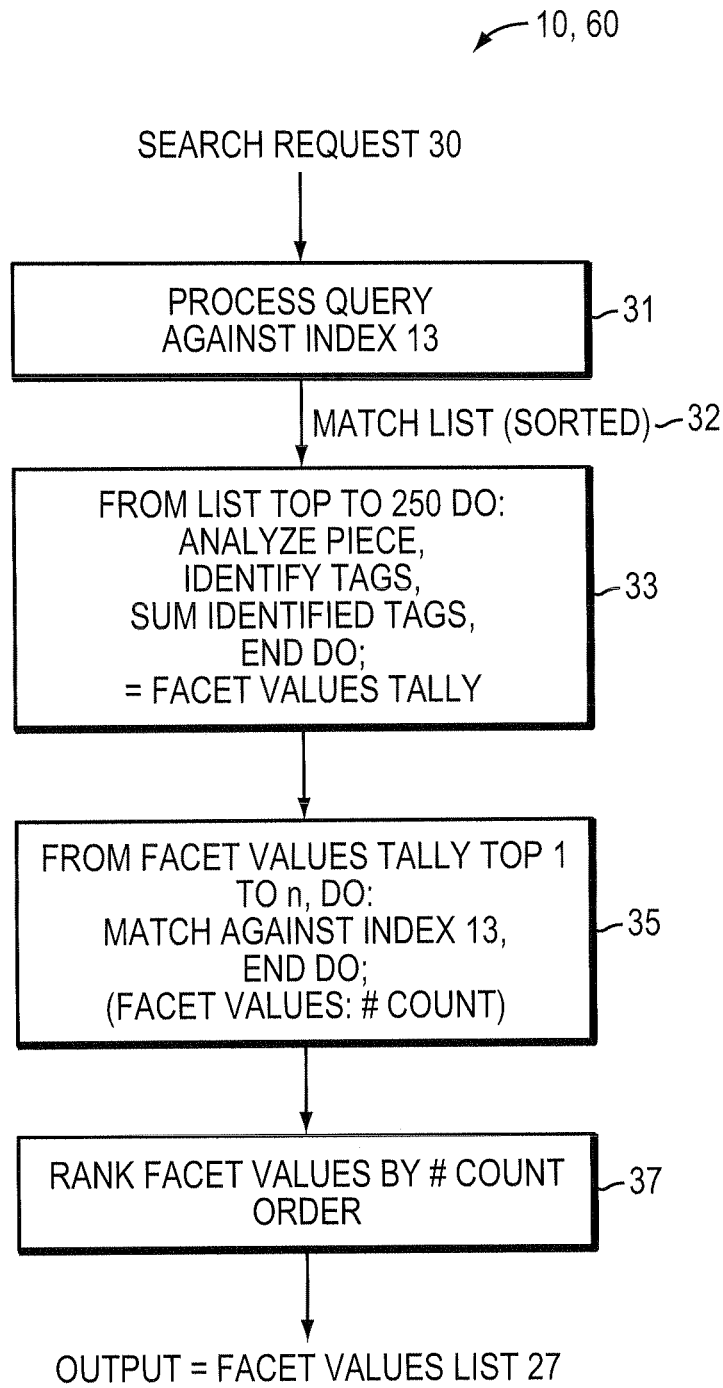
FIG. 3 is a flow diagram of the search engine process of the FIG. 1 embodiment.

FIGS. 2a-2c are illustrative and are described below with non-limiting examples. These examples and illustrated screen views of FIGS. 2a-2c are for purposes of illustration and not limitation of the principles of the present invention.

Content Search

Figure 1:
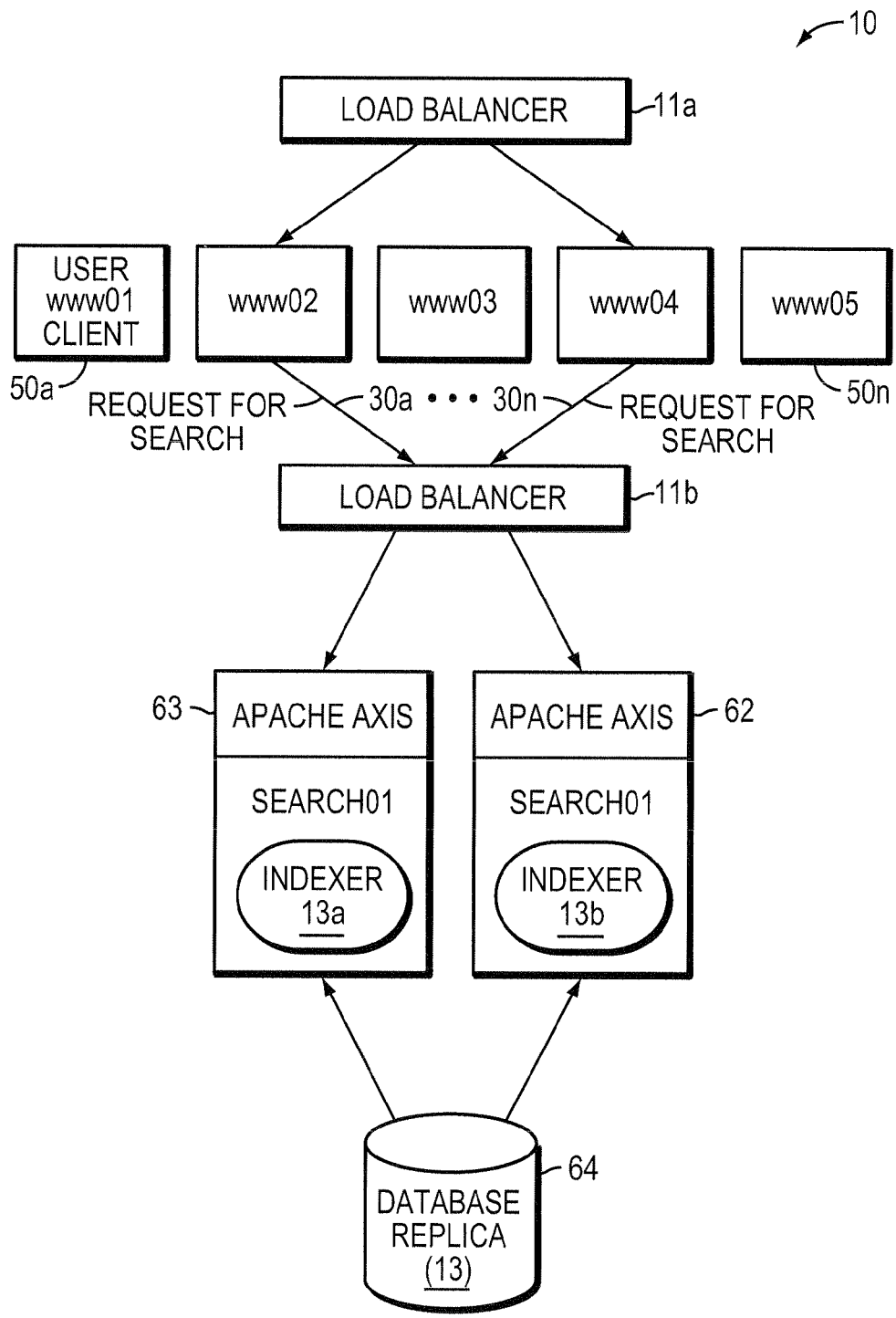
FIG. 1 is a block diagram of one embodiment of the present invention search engine.

Shown in FIGS. 2a-1 and 2a-3 are a search screen view 21a and an advanced search form 21b respectively. Through the search screen view 21a, b, the search engine 10 enables and prompts the user to initiate a search for content. In a preferred embodiment, the content search returns results containing articles, images, and video. Other media types or types of authored works are also suitable. A searcher-user enters a search term (text string) into working window 22 or indications of other search criteria in form 21b (FIG. 2a-3) to initiate a search. The user-entered search terms are typically indicative of the content type and topic that the user seeks (is currently interested in). In response, using the entered search term, the invention search engine 10 searches against the content title and synopsis and displays search results 23 as shown in FIG. 2a-2.

The search results 23 include a list of articles having tags, title words or synopsis keywords that match the original search terms. Also shown in FIG. 2a-2 are various result summaries. One summary 25 outlines the portions of search results by type and number count ("articles (123)"), "images>>(123)", etc.). A session summary 26 indicates the total number of authored works found for the specified search terms (current parameters). See "results: 500+ Articles Found for "search terms" . . . " at summary box 26 in FIG. 2a-2. Session summary 26 also indicates different ones of these current parameters by which the user may choose to modify or refine the search by way of deselection (the respective buttons with minus symbol at 20, as will be made clear below).

Facets and facet values for further refining the search results are listed at 27 which summarize per-facet value, the number of authored works (records generally) in the current search results 23 represented or effected by the facet value. The searcher-user refines the content search results list 23 using one or more of the different facet values at 27. The facets include for example:

tag
length (number of words or minutes)
groups where posted
media type
number of comments
member connection
rating
author
author rating
date (date range) posted
connection type/group As mentioned above, the candidate refinement facet list 27 outlines the relevant facets and facet values given the current search results 23. That is, the facets represented by the listed search results 23 are enumerated by facet value (e.g. "movies", "sports", "group name"). The number of records in the search results 23 having that facet value is also indicated and may be used to order the facet list 27 (most to least, with no facet values having zero records in the search results 23). These indications are sufficient to suggest to the searcher-user the potential impact of including the refining term (certain displayed facet value) in the search criteria.

Upon user selection of a displayed facet value at 27, search engine 10 reruns the search using the combined parameters of the originally entered search terms and the user-selected facet values. Search engine 10 displays the results of the rerun search and updates the session summary 26, results type summary 25, and facet values listings 27. The latter two are updated according to the current (refined) search results listed at 23. With regard to facet lists 27, the update omits facet values that are no longer relevant, removes facet values that are now in the active search parameters, and eliminates empty set facet values. To that end, the user can determine what further refinements exist from the updated facet 27. This in turn enables the user to serially (one pertinent facet value at a time) drill down and refine the search results 23 with selections from each updated facet value list 27. Where the facet value list 27 is free of empty set facet values, the user can continue to drill down/refine and receive non-zero (nonempty) result sets each time.

Session summary 26 shows a running tally of search terms and refinement parameters used. In particular, each userselected facet value is listed 20 in the order used to refine the search. The refinement parameter list 20 enables the user at any given point in the series of search runs, to deselect one or more of the listed (and hence prior included) search refinement parameters. This produces further adjusted search results 23.

In the illustrated example, the searcher-user initially entered 'original search terms' at working window 22 (FIG. 2a-1). Upon the user selecting the "search" button, search engine 10 employs the user-entered search terms and searches across stored content of portal 51. Search engine 10 displays the search results 23 (FIG. 2a-2) and indicates in results summary 25 that 123 records of the search results 23 are articles, and so forth. Search engine 10 also displays refinement list 27, quantitatively indicating (in itemized fashion) that the search results 23 are representative of many tags, groups, and other facets. For example, the search results 23 include 123 review records, 123 records of tagged movies, . . . etc, and 123 article (authored works) records of the search results are posted to "Group name." To refine or effectively filter the search results list 23 to just the movies indicated at 27, the searcher-user selects that facet value (tag) indicator. In response, search engine 10 filters search results 23 accordingly, and updates facet value list 27 and session summary 26.

In the example of FIG. 2a-2, the searcher-user goes on to further stepwise refine initial search results 23 by selecting facet value 'drama', then 'Gather essentials: movies', then 'reviews', then 'Best Films group', 'tarantino,' 'nineties' and lastly 'Travolta.' This is indicated at ordered (in order of use) refinement parameters list 20. Search Engine 10 effectively interprets the search/refinement terms of this stage to request movies that are dramas from the Gather essentials movie collection, having reviews by the Best Films group, and that are related to or connected to Tarantino's movies of the nineties, with Travolta. The minus symbol buttons in refinement parameter list 20 enable the user to modify the current accumulated search terms/refinement parameter set 20 by removing any one or more of the parameters. Search engine 10 is responsive to user deselection of search terms in this manner and reruns the search with the search parameter set 20 adjusted (modified) accordingly. A regenerated search results set or listing 23 results and is displayed.

In one embodiment, only public content items appear in the search results. Results that are restricted to certain users will not appear in search results. Guarded viewing settings also apply to the content that is retrieved from search results.

Through sorting feature 24 (FIG. 2a-2), users are able to sort content search results on the following criteria in one embodiment:
relevance
date published
date modified
highest rated
most ratings
most discussed For image and video search results 23, in one embodiment searcher-users have the option to toggle between a list view and a grid view as illustrated in FIGS. 2a-5 and 2a-6. Search results are paginated and contain advertisements in the body of the search results list 23 when viewed in list format. Preferably, the advertisements are not targeted based upon search terms at this time. Searcher-users are able to click through from search results lists 23 (select an item on a search results list 23) to view the content display for the item. In one embodiment, content results are listed in order of relevance. In one embodiment, the relevance ranking takes the following factors into account:
date published (newer is better)
system 61 community ranking
readership/viewership
connection/popularity level of the author
number of comments (higher is better), with a weight based on who gave the comment
comment recency (newer is better)
rating weighted relative to the number of ratings (higher is better), where weight considers who gave the rating
number and/or specificity of tags (fewer is better)
number of groups (fewer is better)

Thus, the reference factor considers substantially all pieces of information in system 61, including variables pertaining to the author. As such, the reference ranking is determined by and is a reflection of social interaction, ratings, and acceptability to the network community of users.

Each factor is weighted by a different amount in order to provide desirable search results. Preferably these weights are dynamically changeable without having to deploy the application.

The invention search engine 10 displays a feedback message and some other actionable links (shown between angled brackets) if no content search results are found. FIG. 2a-4 is illustrative.

People Search

As shown in FIGS. 2b-1 through 2b-3, the people search includes results from all members on network community site 51. Searcher-users enter a single search term (text string) 22 or a multi-faceted search criteria/terms 21b to initiate a search as described above. The invention search engine 10 uses the search term 22, 21b and searches against the member name, username, community defined facet values, and describe yourself fields of various portal 51 screen views. Similar to the content search, search engine 10 displays search results 23, session summary 26 and refinement facets/facet values at 27 for a subject people search.

Searcher-users refine the people search results list 23 using different facets, including the following:
age (range)
location
number of children
published on tag
group membership
gender
sexual orientation
relationship (marital) status
favorite music
favorite books
favorite authors
favorite films
favorite TV shows
favorite foods
other interests
heroes
hobbies
clubs and organizations
religious affiliation
political affiliation
companies worked for
college(s)/schools
high school(s)

In one embodiment, only public information appears in people search results 23 or is made available to use as facets for refinement. Connection-level permissions set on profile elements eliminate those facet values from appearing in people search results 23.

Some embodiments of the invention search engine 10 enable searcher-users to sort people search results on the following criteria:
  relevance
  recency of sign-in
  recency of profile update
  username Similar to content searches, in people searches users have the option to toggle between a list view and a grid view. The invention search engine 10 enables searcher-users to click through (select a listed item) from search results lists 23 to view the namespace for any network community member on the list.

In one embodiment, people search results are listed in order of relevance. The relevance ranking takes the following factors into account:
  recency of sign-in (newer is better)
  recency of profile update (newer is better)
  has a profile (has some data is better)
  has an icon (has an icon is better)

Each factor is weighted by a different amount in order to provide desirable search results. Preferably, these weights are dynamically changeable without having to deploy the application.

Lastly, the invention search engine 10 displays a feedback message and some other actionable links if no people search results are found (similar to FIG. 2a-4 discussed above).

Group Search

With reference to FIGS. 2c-1 through 2c-2, the group search can include results from all groups on the network community site 51. As described above for content and people searches, searcher-users enter a single search term (text string) 22 or multi-faceted set of search term(s) 21b to initiate a search. The invention search engine 10 uses the search terms to search against the group name, group username, synopsis, and group description used in portal 51. Similar to content search and people search, search engine 10 displays search results 23, session summary 26 and refinement facets/facet values at 27 according to the subject group search. The invention search engine 10 enables searcher-users to refine group search results lists 23 using different facets, including the following:
  group tags
  membership size
  location
  content published
  events in group
  recency of activity
  friend ownership/membership
  by member or number of members (e.g., three or more of my friends are members, or John is a member)

In some embodiments, only public groups appear in search results or are available to use as facet values for refinement.

Searcher-users are able to sort group search results on the following criteria:
  relevance
  group name
  date created
  number of members Searcher-users have the option to toggle between a list view and a grid view, similar to that described above.

Searcher-users are able to click through from the group search results lists 23 to view the namespace and profile for any group on the list.

In one embodiment, group search results 23 are listed in order of relevance. The relevance ranking takes the following factors into account:
  number of members (more is better)
  date created (newer is better)
  has a description (has a description is better)
  has an icon (has an icon is better)
  has a banner (has a group banner is better)

Each factor is preferably weighted by a different amount in order to provide desirable search results. These weights are dynamically changeable in some embodiments.

Similar to content search and people search, the invention search engine 10 displays a feedback message and some other actionable links if no group search results are found. FIG. 2a-4 is illustrative.

Event Search

The event search includes results from all scheduled or posted events on network community site 51. Searcher-users enter single or multi-faceted search terms 22, 21b to initiate a search as described above. Search engine 10 uses the search term(s) and searches against event name, user name and event description fields of portal 51 screen views for creating an event. Search engine 10 displays search results 23, session summary 26 and refinement facets/facet values 27 for a subject event search.

Searcher-users refine event search results lists 23 using facets including:
  location
  date
  number of attendees
  friends invited
  event tags
  group connection
  event category (fundraiser, reunion, party . . . )
  admission (free or paid)
  length of time
  access status (open, closed, private)

Users are able to sort event search results on the following criteria:
  relevance
  date created or published
  date modified Similar to the other discussed searches, in event searches users have the option to toggle between a list view and a grid view. Search engine 10 enables users to click through (select a listed item) from search results list 23 to view the event display for the item.

In one embodiment, event search results are listed in order of relevance. The relevance ranking takes the following factors into account:
  date created or published (newer is better)
  number of tags (fewer is better)
  has description (has a description is better)

Each factor is preferably weighted. The weights may be dynamically changeable.

Similar to the other searches, search engine 10 displays a feedback message and some actionable links if no event search results are found (as illustrated in FIG. 2a-4).

Search Term Rules

In a preferred embodiment, search engine 10 is rule-based. Pertinent rules are as follows.

Results Limits

Presentation of the search results 23 will indicate the total number of matching records; however, preferably only 500 results will be shown and paginated for the user to browse at a time. Some embodiments enable the user to jump among pages in the result set 23 up to the page that contains the last result or 500$^{th}$ result, depending upon the number of results returned. If the user refines the search results 23, the refinement is applied to the entire set of matching records, not just to the 500 if that many were displayed.

Refinement Facets and Values

Embodiments enable users to apply and remove refinements from the result set 23 in any order. Refinements may be selected from a listing of any combination of facets and facet values of the records in the search results, meaning facet values alone may be listed, or facets as well as facet values may listed. A user may select any one or combination of facets and facet values from the listing, meaning that a facet alone may be selected, or a facet value alone may be selected, or both may be selected. Some embodiments may enable users to select a facet value and thereby inherently select the corresponding facet as well. Alternative embodiments may require the user to first select a facet and then select a facet value. Regardless of how the refinement parameter is obtained, adding a refinement parameter further narrows the result set 23 that is currently retrieved and active. Removing a refinement parameter removes that condition from the narrowing of the result set 23.

By default, only ten or fewer refinement values (facet values) appear for each facet. The facet values are ordered according to their number of matches within the current results set 23. If more than ten values exist, the search engine 10 provides to the user the option to view all of the values that appear for that refinement facet.

Search Index Refresh

New site or portal 51 additions are added to the search index on a regular basis, but not immediately when they are posted or changed. The search index should refresh at least once every hour to show updated results.

Advanced Search

In addition to searching via a single search term and selecting refinement facets, users are able to initiate a multi-faceted search for content, people, and groups as a starting point. See advanced search from 21b in FIGS. 2a-3, 2b-2, 2b-3 and 2c-2.

The advanced content search accepts multiple criteria that are joined together to find search results that match all of the criteria supplied. Preferably this feature enables users to enter the following criteria for an advanced content search:
    search term (text string; searches the same fields as the basic search 21a)
        title (articles and video only)
        username (author)
        group (text field)
        tag (text field; can include multiple, comma-separated tags) publish date range (select dates up to a 30-day range)

The advanced people search accepts multiple criteria that the search engine 10 joins together to find search results that match all of the criteria supplied. Preferred embodiments enable users to enter the following criteria for an advanced people search:
    search term (text string; searches the same fields as the basic search 21a)
        member name
        username
        location
        sexual orientation
        relationship status
        gender
        favorite music
        favorite books
        favorite authors
        favorite films
        favorite TV shows
        favorite foods
        other interests
        heroes
        hobbies
        clubs and organizations
        religious affiliation
        political affiliation
        companies I've worked for
        college(s)/schools
        high school(s)

The advanced group search accepts multiple criteria that the search engine 10 joins together to find search results that match all of the criteria supplied. Embodiments enable users to enter the following criteria for an advanced group search:
    search term (text string; searches the same fields as the basic search 21a)
        group name
        group username
        group owner (member name)
        group tags (text field; can include multiple, comma-separated tags)
        created date range (select dates up to 30-day range)

Targeted Advertising

Some embodiments of the invention present targeted advertisements to the user. Targeted advertisements may be presented to the user based on the user input search term. Additionally, after a listing of facets or facet values is displayed along with the original search results, and after the user selects a facet or facet value from that listing, the targeted advertising may be refined based on the user-selected facets or facet values.

In another embodiment, given the foregoing, the present invention can be applied to navigation of sites (e.g., websites or other computer network sites) as a component of a graphical user interface (GUI). The user provides an input term, which is matched across a data store of the subject site to produce a first set of results listing any one or combination of facets and facet values as described above. The present invention enables the user to refine the initial input by selecting from a list of facets and/or facet values. Upon user selection of any one or combination of facets and facet values from the listing, the invention refines the input term, resulting in a refined input term formed of the original input term plus the user-selected any one or combination of facets and facet values. The invention uses the refined input term to help the user navigate on the site to the location of the refined input term. Common or known site navigation methods and techniques may be employed to implement or support this process.

Figure 5:
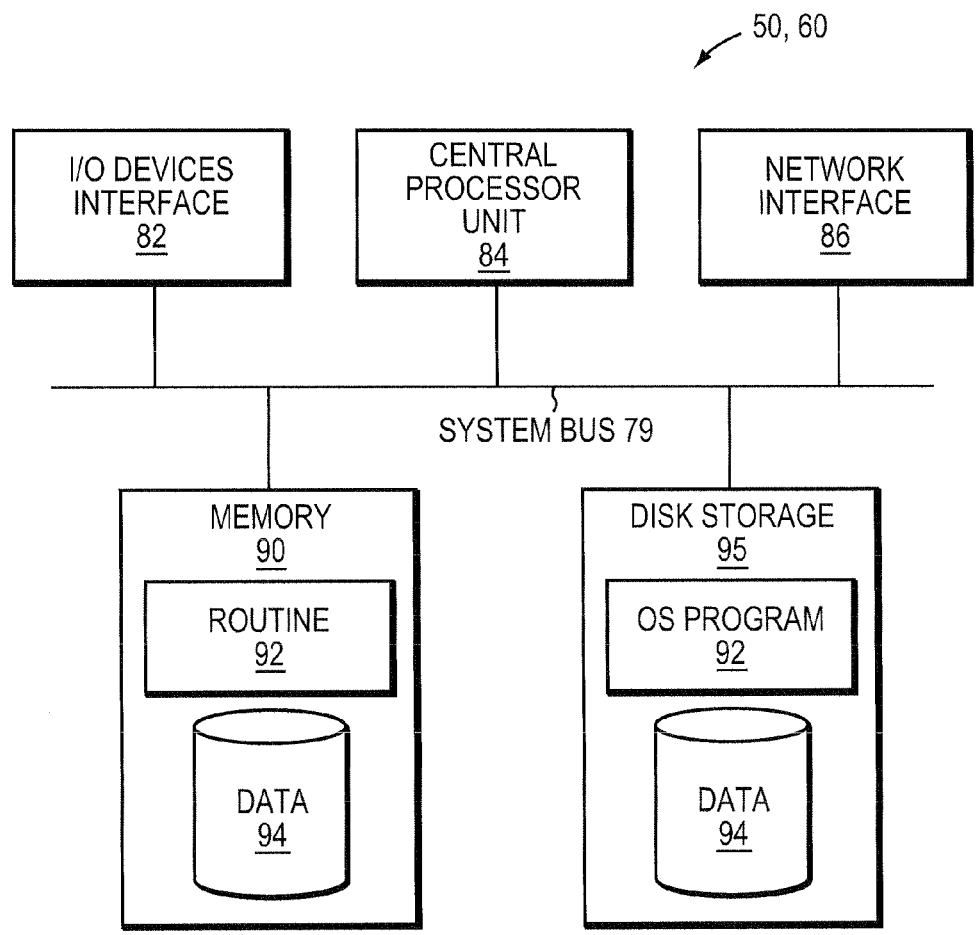
FIG. 5 is a block diagram of a computer node in the network of FIG. 4.

The foregoing features and effects are accomplished by embodiments of the present invention as follows. With reference to FIGS. 4 and 5, embodiments of the present invention collect the network community (various user generated) data in databases 94. Databases 94 form a central database system 63. Server 60a reads the central database 63 and creates a highly optimized index of the data contained in the database 63. In particular, search engine 10 incrementally makes a full copy 64 of central database 63 into index 13. Preferably this is done about once a day. Server 60a/search engine 10 reindexes index 13 incrementally throughout the day (e.g., every 15 minutes or so).

Next server 60a/search engine 10 replicates index 13 across other servers 60b for search engine request processing. Servers 60 *a, b* load index replicas 13a, b into memory and maintain (with refresh operations) the indexes 13a, b there. As a result, at any given time, whichever server 60a, b is available to process an incoming search request 30 is properly equipped to do so.

Turning to FIG. 1, the preferred embodiment utilizes the open source Lucene library (version 2.3) as the core implementation of the invention search engine 10. Four Lucene indexes 13 are created from input by the network community users interacting with the subject network portal or site 51 as summarized above. The four indexes 13 are:

Content
People
Groups
Events

Each index is created separately via a scheduled batch job on a search server 60a, b. This batch job controls the Lucene index creation for each of the four indexes.

The invention system architecture is based upon a standard Web Services framework. This Web Services framework serves as the basis for service level functionality. Search requests 30 are handled by a dedicated bank of "search" machines 60a, b. The web application machines 50 issue a search request 30 through a web services protocol via HTTP. The bank of search machines/servers 60a, b are preferably load balanced by load balancers 11a, b. This allows scalability and redundancy. Each search machine 60a, b contains its own private copy of the search indexes 13a, b as described above.

The process for generating the facet list 27 for a given search request 30 is then as illustrated in FIG. 3. In response to an in coming search request 30, search server 60a forms a query using the search terms of the search request 30. The Server 60a compares the search request query against previously processed requests (cached results), and if found, returns the results previously generated. Previously processed results for queries may be cached for a certain time period before being considered too old and being discarded (cache timeout). Some highly popular search queries may be processed and placed into the server's cache upon server initialization (pre-cache). Server 60a processes the formed query against index 13a (step 31). The total number of pieces in index 13a that match the query is determined, and the matching pieces used are to generate a match list 32. Server 60a sorts the generated match list by relevance ranking (discussed above per type of search—people, contact, group, or event). Next, at step 33, search engine 10 generates a facets tally by analyzing the first piece in the sorted match list 32 to determine search type (people, content, group, or event) and tag assignments. Search engine 10 uses the determined tags as facet values. Search engine 10 repeats this step 33 with each of the first 250 pieces on sorted match list 32, keeping a tally of the identified tags as facet values. A working tally of facet values results.

From the working tally of facet values, step 35 processes the top n, i.e., the highest-quantity facet values. In a preferred embodiment, n=100. For each of these n facet values, step 35 utilizes index 13 to get an actual count of the number of records that use the subject facet value. At the end of step 35, search engine 10 has, for each of certain facet values, the respective total number of pertinent records that appear in a current search results set 23.

Step 37 ranks the facet values by the actual record count determined in step 35, and outputs for display the facet values list 27 with respective facet value counts per facet values.

Thus steps 31 and 33 effectively form a first phase of the process of FIG. 3, which produces a good approximation. The good approximation is based on a sample count of facet values. Then a second phase (step 35) takes the highest phase one facet values and refines an existing search to get an exact facet value count. This two-phase approach provides certain computational and processing efficiencies.

FIG. 4 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

FIG. 5 is a diagram of the internal structure of a computer (e.g., client processor/device 50 or server computers 60) in the computer system of FIG. 4. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 4). Memory 90 provides volatile storage for computer software instructions 92 and data 94 used to implement an embodiment of the present invention (e.g., search engine 10, Indexers 13 and code of FIG. 3 for generating facet value lists 27 detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

For example, the present invention may be implemented in a variety of computer architectures. The computer network of FIGS. 4 and 5 are for purposes of illustration and not limitation of the present invention.

While this invention has been particularly shown and described with references to example embodiments thereof, it will be understood by those skilled in the art that various changes in form and details may be made therein without departing from the scope of the invention encompassed by the appended claims.

What is claimed is:

1. A database search method comprising the computer implemented steps of:
   providing access to a database having a plurality of records in respective categories of information, each record having one or more facets to the respective category of information;
   receiving user input of a first search term formed of a first parameter indicative of at least one category of information of the database;
   searching the database for records of the at least one category of information;
   in response to the user input of the first search term, simultaneously displaying both in a same screen view:
   (a) a set of search results, including records from the database of the at least one category of information, and
   (b) a listing of any one or combination of facets and facet values of the records in the set of search results, the listing serving as suggested additional parameters for further refining the first search term upon user selection of the any one or combination of facets and facet values;
   enabling user input of a second search term formed of a second parameter; and
   in response to user selection of any one or combination of facets and facet values from the listing or user input of the second search term, refining the first search term based on the user selection of the any one or combination of facets and facet values from the listing or user input of the second search term, resulting in (i) a refined search term formed of the first parameter plus the user-selected any one or combination of facets and facet values or user-inputted second search term, and (ii) a search of the database using the refined search term, wherein at least one of the any one or combination of facets and facet values is defined by a community of users and corresponds to content generated by the community of users.

2. A method as claimed in claim 1, wherein the listing of facets is by facet number and kind, a facet number being a count of the entries having that kind of facet.

3. A method as claimed in claim 2, wherein facet number provides an indication of an interesting cross-section of a category of information.

4. A method as claimed in claim 1, wherein the listing of facet values is by facet value count and kind, a facet value count being a count of the entries being described with that facet value.

5. A method as claimed in claim 4, wherein the listing of facet values is rank-ordered by facet value count.

6. A method as claimed in claim 4, wherein the listing of facet values is rank-ordered by statistical correlation with respect to the search query.

7. A method as claimed in claim 4, wherein facet value count provides an indication of an interesting cross-section of a category of information.

8. A method as claimed in claim 1, wherein the listing of any one or combination of facets and facet values is ordered based on relevance to the data set.

9. A method as claimed in claim 8, wherein the listing order provides an indication of an interesting cross-section of a category of information.

10. A method as claimed in claim 1, wherein the facets being defined by a community of users include: users defining types of facets, and users suggesting new categories of information and defining corresponding facets.

11. A method as claimed in claim 1, wherein for categories of information pertaining to people, the facets include any of gender, school, age, marital/family status, geographic location, group membership, company/business entity, entertainment/literature interest, and tags, by member connection, and by connection type/group.

12. A method as claimed in claim 11, wherein a user may create or invite a group of others into a group and any one or combination of the organizer and the group members may define facets specific to that group.

13. A method as claimed in claim 11 wherein respective values of facets are determined by any one or combination of user community activity and user community-entered information continuously tallied over time.

14. A method as claimed in claim 11, wherein respective values of facets are determined by computer system tallies of user activity.

15. A method as claimed in claim 11, wherein at least one facet is defined by a single user.

16. A method as claimed in claim 1, wherein for categories of information pertaining to content, the facets include any of media type, tags, length, rating, groups where posted, author, author ranking, number of comments, date posted, by member connection, and by connection type/group.

17. A method as claimed in claim 1, wherein for categories of information pertaining to groups, the facets include any of tags, content published, membership size, geographic location, events, recency of activity, friend ownership/membership, and by any one or combination of member and number of members.

18. A method as claimed in claim 1, wherein for categories of information pertaining to events, the facets include any of location, date, number of people, friends invited, tags, group, category, admission price, length of time, and accessibility.

19. A method as claimed in claim 1, wherein the displayed set of search results is an ordered set.

20. A method as claimed in claim 19, wherein the displayed set of search results is a list of any one or combination of names, usernames, and images of people, and ordering of the set is a ranking by any one or combination of:
   relative closeness of relationship between the user and each person listed;

degree of relative interaction; and
social importance in the community of users.

21. A method as claimed in claim 19, wherein the displayed set of search results is a list of content works and the ordering of the set is a ranking by any one or combination of relative readership of the content works, recency, ratings, connection level to the author, moderated group acceptance level, tag specificity level, and impact among readers.

22. A method as claimed in claim 19, wherein the displayed set of search results is limited to the content works of members posted to a certain group on a site.

23. A method as claimed in claim 19, wherein the displayed set of search results is limited to the member profiles of members connected to the searcher in a social network.

24. A method as claimed in claim 19, wherein the displayed set of search results is limited to the content works of members connected to the searcher in a social network.

25. A method as claimed in claim 19, wherein the displayed set of search results is limited to one or more of the groups created and the groups joined by members connected to the searcher in a social network.

26. A method as claimed in claim 1, wherein the displayed set of search results includes an indication of the total number of records in the search results and the steps of
    a) refining the first search term in response to user selection of any one or combination of facets and facet values; and
    b) searching the database using the refined search term are repeated to reduce the total number of records in the search results.

27. A method as claimed in claim 1, where a facet is defined as "Group Membership" and facet values are the groups a member has joined.

28. A method as claimed in claim 1, wherein a facet is defined as "Attendance of an Event" and facet values are the events a member is attending.

29. A method as claimed in claim 1, wherein facet values with facet value count of zero are not listed adjacent search results.

30. A method, as claimed in claim 1, wherein a facet that contains facet values all of which, or all but one of which, have a facet value count of zero is not listed.

31. A method as claimed in claim 1, wherein certain facets and facet values may be set by programmers, certain facets and facet values may be defined by members, and certain facet values may be determined by the system through observation, regardless of who defined the facets themselves.

32. A method as claimed in claim 1, wherein facet value display is limited to facet values with a facet value count above some minimum number.

33. A method as claimed in claim 1, wherein facet value display is limited to a certain number of facet values for each facet.

34. A method as claimed in claim 1, wherein facet value display is limited by any one or combination of facet value count and number of facet values and where a user can request, receive, and select from a complete list of available facet values.

35. A database search method comprising the computer implemented steps of:
    providing access to a plurality of databases, each database having a plurality of records in respective categories of information, each record having one or more facets to the respective category of information;
    receiving user input of a first search term formed of a first parameter indicative of at least one category of information of the databases;
    searching the databases for records of the at least one category of information;
    in response to the user input of the first search term, simultaneously displaying both in a same screen view:
        (a) a set of search results, including records from the databases of the at least one category of information, and
        (b) a listing of any one or combination of facets and facet values of the records in the set of search results, the listing serving as suggested additional parameters for further refining the first search term upon user selection of the any one or combination of facets and facet values;
    enabling user input of a second search term formed of a second parameter; and
    in response to user selection of any one or combination of facets and facet values from the listing or user input of the second search term, refining the first search term based on the user selection of any one or combination of facets and facet values from the listing or user input of the second search term, resulting in (i) a refined search term formed of the first parameter plus the user-selected any one or combination of facets and facet values or user-inputted second search term, and (ii) a search of the databases using the refined search term, wherein at least one of the any one or combination of facets and facet values is defined by a community of users and corresponds to content generated by the community of users.

36. A method for targeting advertising comprising the computer-implemented steps of:
    providing access to a database having a plurality of records in respective categories of information, each record having one or more facets to the respective category of information;
    receiving user input of a first search term formed of a first parameter indicative of at least one category of information of the database;
    in response to the user input of the first search term, simultaneously displaying both in a same screen view:
        (a) a set of search results, including records from the database of at least one category of information, and
        (b) a listing of any one or combination of facets and facet values of the records in the set of search results, the listing serving as suggested additional parameters for further refining the first search term upon user selection of the any one or combination of facets and facet values, wherein at least one of the any one or combination of facets and facet values is defined by a community of users and corresponds to content generated by the community of users;
    targeting advertising to the user based on the user inputted first search term;
    enabling user input of a second search term formed of a second parameter;
    in response to user selection of any one or combination of facets and facet values from the listing or user input of the second search term, refining the first search term, term resulting in (i) a refined search term formed of the first parameter plus the user selected any one or combination of facets and facet values or user inputted second search term, and (ii) a search of the database using the refined search term; and
    refining targeting of advertising based on the user selected any one or combination of facets and facet values or user inputted second search term.

37. A computer system comprising:

a database having a plurality of records in respective categories of information, each record having one or more facets to the respective category of information;

means for receiving user input of a first search term formed of a first parameter indicative of at least one category of information of the database;

a search engine to implement a search of the database for records of the at least one category of information;

means for displaying, in response to the user input of the first search term, simultaneously displaying both in a same screen view:

(a) a set of search results, including records from the database of the at least one category of information, and (b) a listing of any one or combination of facets and facet values of the records in the set of search results, the listing serving as suggested additional parameters for further refining the first search term upon user selection of the any one or combination of facets and facet values, wherein at least one of the any one or combination of facets and facet values is defined by a community of users and corresponds to content generated by the community of users;

means for enabling user input of a second search term formed of a second parameter; and a refinement engine for refining the search based on the listing and additional user input or the second search term.

38. A system as claimed in claim 37, wherein the listing of facets is by facet number and kind, a facet number being a count of the entries having that kind of facet.

39. A system as claimed in claim 38, wherein facet number provides an indication of an interesting cross-section of a category of information.

40. A system as claimed in claim 37, wherein the listing of facet values is by facet value count and kind, a facet value count being a count of the entries being described with that facet value.

41. A system as claimed in claim 40, wherein the listing of facet values is rank-ordered by facet value count.

42. A system as claimed in claim 40, wherein the listing of facet values is rank-ordered by statistical correlation with respect to the search query.

43. A system as claimed in claim 40, wherein facet value count provides an indication of an interesting cross-section of a category of information.

44. A system as claimed in claim 37, wherein the listing of any one or combination of facets and facet values is ordered based on relevance to the data set.

45. A system as claimed in claim 44, wherein the listing order provides an indication of an interesting cross-section of a category of information.

46. A system as claimed in claim 37, wherein for categories of information pertaining to people, the facets include any of gender, school, age, marital/family status, geographic location, group membership, company/business entity, entertainment/literature interest, and tags, by member connection, and by connection type/group.

47. A system as claimed in claim 37, wherein for categories of information pertaining to groups, the facets include any of tags, content published, membership size, geographic location, events, recency of activity, friend ownership/membership, and by member or number of members.

48. A system as claimed in claim 37, wherein for categories of information pertaining to events, the facets include any of location, date, number of people, friends invited, tags, group, category, admission price, length of time, and accessibility.

49. A system as claimed in claim 37, wherein the displayed set of search results is an ordered set.

50. A system as claimed in claim 49, wherein the displayed set of search results is a list of any one or combination of names, usernames, and images of people, and ordering of the set is a ranking by any one or combination of:

relative closeness of relationship between the user and each person listed;

degree of relative interaction; and social importance in the community of users.

51. A system as claimed in claim 49, wherein the displayed set of search results is a list of content works and the ordering of the set is a ranking by any one or combination of relative readership of the content works, recency, ratings, connection level to the author, moderated group acceptance level, tag specificity level, and impact among readers.

52. A system as claimed in claim 49, wherein the displayed set of search results is limited to the content works of members posted to a certain group on a site.

53. A system as claimed in claim 49, wherein the displayed set of search results is limited to the member profiles of members connected to the searcher in a social network.

54. A system as claimed in claim 49, wherein the displayed set of search results is limited to the content works of members connected to the searcher in a social network.

55. A system as claimed in claim 49, wherein the displayed set of search results is limited to one or more of the groups created and the groups joined by members connected to the searcher in a social network.

56. A system as claimed in claim 37, wherein the displayed set of search results includes an indication of the total number of records in the search results, and the steps of a) refining the first search term in response to user selection of any one or combination of facets and facet values; and b) searching the database using the refined search term are repeated to reduce the total number of records in the search results.

57. A system as claimed in claim 37, wherein a facet is defined as "Group Membership" and facet values are the groups a member has joined.

58. A system as claimed in claim 37, wherein a facet is defined as "Attendance of an Event" and facet values are the events a member is attending.

59. A system as claimed in claim 37, wherein facet values with facet value count of zero are not listed adjacent search results.

60. A system, as claimed in claim 37, wherein a facet that contains facet values all of which, or all but one of which, have a facet value count of zero is not listed.

61. A system as claimed in claim 37, wherein certain facets and facet values may be set by programmers, certain facets and facet values may be defined by members, and certain facet values may be determined by the system through observation, regardless of who defined the facets themselves.

62. A system as claimed in claim 37, wherein facet value display is limited to facet values with a facet value count above some minimum number.

63. A system as claimed in claim 37, wherein facet value display is limited to a certain number of facet values for each facet.

64. A system as claimed in claim 37, wherein facet value display is limited by any one or combination of facet value count and number of facet values and where a user can request, receive, and select from a complete list of available facet values.

65. A system as claimed in claim 37, wherein the database includes network community data from users interacting with a network portal or site, with the system further comprising:
- a central database formed of a plurality of such databases;
- a plurality of servers which read the central database;
- at least one highly optimized index of the data in the central database, where the index is created by and stored on a first server;
- replicas of said index which are created by the first server and are stored on servers other than the first server.

66. A system as claimed in claim 65, wherein the indexes created include Content, People, Groups, and Events.

67. A system as claimed in claim 65, further comprising load balancers to balance the load on the servers.

68. A system as claimed in claim 37, wherein the facets being defined by a community of users include: users defining types of facets, and users suggesting new categories of information and defining corresponding facets.

69. A system as claimed in claim 61, wherein a user may create or invite a group of others into a group and any one or combination of the organizer and the group members may define facets specific to that group.

70. A system as claimed in claim 68, wherein respective values of facets are determined by any one or combination of user community activity and user community-entered information continuously tallied over time.

71. A system as claimed in claim 68, wherein respective values of facets are determined by computer system tallies of user activity.

72. A system as claimed in claim 68, wherein at least one facet is defined by a single user.

73. A computer system comprising:
- a plurality of databases, each database having a plurality of records in respective categories of information, each record having one or more facets to the respective category of information;
- means for receiving user input of a first search term formed of a first parameter indicative of at least one category of information of the databases;
- a search engine to implement a search of the databases for records of the at least one category of information;
- means for displaying, in response to the user input of the first search term, simultaneously displaying both in a same screen view:
  - (a) a set of search results, including records from the databases of the at least one category of information, and
  - (b) a listing of any one or combination of facets and facet values of the records in the set of search results, the listing serving as suggested additional parameters for further refining the first search term upon user selection of the any one or combination of facets and facet values;
- a refinement engine for refining the search based on the listing and additional user input;
- means for receiving user input of any one or combination of facets and facet values from the listing or user input of a second search term; and
- means for refining the first search term, in response to user input of a facet or facet value from the listing, resulting in (i) a refined search term formed of the first parameter plus any one or both of the facet and the facet value or the second search term, and (ii) a search of the database using the refined search term, wherein at least one of the any one or both of the facets and facet values is defined by a community of users and corresponds to content generated by the community of users.

74. A system as claimed in claim 37, wherein for categories of information pertaining to content, the facets include any of media type, tags, length, rating, groups where posted, author, author ranking, number of comments, date posted, by member connection, and by connection type/group.

75. An advertising engine comprising:
- a database having a plurality of records in respective categories of information, each record having one or more facets to the respective category of information;
- means for receiving user input of a first search term formed of a first parameter indicative of at least one category of information of the database;
- means for displaying, in response to the user input of the first search term, simultaneously displaying both in a same screen view:
  - (a) a set of search results, including records from the database of at least one category of information, and
  - (b) a listing of any one or combination of facets and facet values of the records in the set of search results, the listing of facet values serving as suggested additional parameters for further refining the first search term upon user selection of the any one or combination of facets and facet values, wherein at least one of the any one or combination of facets and facet values is defined by a community of users and corresponds to content generated by the community of users;
- advertisements that are displayed to the user and that are targeted to the user based on the user input search term;
- means for enabling user input of a second search term formed of a second parameter;
- means for refining the search term in response to user selection of any one or combination of facets and facet values from the listing or user input of the second search term, resulting in (i) a refined search term formed of the first parameter plus the user-selected any one or combination of facets or facet values or second search term, and (ii) a search of the database using the refined search term; and
- means for refining targeting of advertising based on any one or combination of user-selected facets and user-selected facet values or second search term.

76. A site navigation method comprising the computer implemented steps of:
- providing access to a data store having information indicative of a subject site, said information being in respective categories of information, there being one or more facets to the respective categories of information;
- receiving user input of a first input term formed of a first parameter indicative of at least one category of information of the data store;
- matching the first input term to the data store to identify at least one category of information;
- in response to the user input of the first input term, simultaneously displaying both in a same screen view:
  - (a) a set of results, including indications from the data store of the at least one category of information, and
  - (b) a listing of any one or combination of facets and facet values in the set of results, the listing serving as suggested additional parameters for further refining the first input term upon user selection of any one or combination of the facets and facet values, wherein at least one of the any one or combination of facets and facet values is defined by a community of users of the subject site and corresponds to content generated by the community of users of the subject site; and
- enabling user input of a second search term formed of a second parameter;

in response to user selection of any one or combination of facets and facet values from the listing, refining the first input term, resulting in a refined input term formed of the first parameter plus the user-selected any one or combination of facets and facet values or user input of the second search term;

matching the refined input term to the data store to identify information corresponding to the refined input term; and navigating to the location on the site of the refined input term.

* * * * *